United States Patent
Matsubara

(10) Patent No.: US 9,205,864 B2
(45) Date of Patent: Dec. 8, 2015

(54) DRIVING ASSISTANCE SYSTEM FOR VEHICLE

(75) Inventor: Toshiyuki Matsubara, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/349,167

(22) PCT Filed: Oct. 3, 2011

(86) PCT No.: PCT/JP2011/072751
§ 371 (c)(1),
(2), (4) Date: Apr. 2, 2014

(87) PCT Pub. No.: WO2013/051081
PCT Pub. Date: Apr. 11, 2013

(65) Prior Publication Data
US 2014/0244114 A1    Aug. 28, 2014

(51) Int. Cl.
*A01B 69/00* (2006.01)
*B62D 6/00* (2006.01)
*B62D 11/00* (2006.01)
*B62D 12/00* (2006.01)
*B63G 8/20* (2006.01)
(Continued)

(52) U.S. Cl.
CPC ............ *B62D 6/002* (2013.01); *B60W 10/184* (2013.01); *B60W 10/20* (2013.01); *B60W 30/09* (2013.01); *B60W 30/0956* (2013.01); *G05D 1/024* (2013.01); *G05D 1/0246* (2013.01); *G08G 1/165* (2013.01)

(58) Field of Classification Search
CPC . B60W 10/184; B60W 30/09; B60W 30/143; B60W 50/14; G01S 17/023; G01S 19/17; G01S 19/50; G01S 19/42
USPC ............. 701/1, 96, 93, 472, 9, 41, 10, 23, 36, 701/408, 43, 45, 48, 516
See application file for complete search history.

(56) References Cited

U.S. PATENT DOCUMENTS 6,092,619 A *  7/2000  Nishikawa et al. ........... 180/446
6,686,867 B1 *  2/2004  Lissel et al. ..................... 342/70
(Continued)

FOREIGN PATENT DOCUMENTS

JP    2002-091565 A    3/2002
JP    2004-504216 A    2/2004
(Continued)

*Primary Examiner* — Calvin Cheung
*Assistant Examiner* — Luis A Martinez Borrero
(74) *Attorney, Agent, or Firm* — Kenyon & Kenyon LLP

(57) ABSTRACT

An object is to prevent a driving assistance system for a vehicle from causing a collision of the self-vehicle with a solid object by performing driving assistance. To achieve the object, when a solid object that can be an obstacle exists in the course of the self-vehicle, the driving assistance system according to the present invention determines a plurality of paths along which the self-vehicle can travel by changing the momentum thereof, designates an avoidance line along which the solid object can be avoided from among the plurality of paths, and changes the momentum of the self-vehicle in such a way that the self-vehicle travels along the selected avoidance line. If the plurality of path do not include a path along which the solid object can be avoided, the driving assistance system changes the momentum of the self-vehicle again in the middle of a path selected from among the aforementioned paths, thereby avoiding the solid object.

7 Claims, 14 Drawing Sheets

(51) Int. Cl.

| | | |
|---|---|---|
| *B63H 25/04* | (2006.01) | |
| *G05D 1/00* | (2006.01) | |
| *G06F 7/00* | (2006.01) | |
| *G06F 17/00* | (2006.01) | |
| *G06F 19/00* | (2011.01) | |
| *G05D 1/02* | (2006.01) | |
| *B60W 10/184* | (2012.01) | |
| *B60W 10/20* | (2006.01) | |
| *B60W 30/09* | (2012.01) | |
| *B60W 30/095* | (2012.01) | |
| *G08G 1/16* | (2006.01) | |

(56) References Cited

U.S. PATENT DOCUMENTS

| | | | | |
|---|---|---|---|---|
| 7,113,867 | B1 * | 9/2006 | Stein | 701/301 |
| 7,510,038 | B2 * | 3/2009 | Kaufmann et al. | 180/169 |
| 7,809,506 | B2 * | 10/2010 | Kuge et al. | 701/301 |
| 8,483,956 | B2 * | 7/2013 | Zhang | 701/428 |
| 8,537,338 | B1 * | 9/2013 | Medasani et al. | 356/4.01 |
| 2004/0090117 | A1 * | 5/2004 | Dudeck et al. | 303/191 |
| 2004/0193374 | A1 * | 9/2004 | Hac et al. | 701/301 |
| 2005/0115753 | A1 * | 6/2005 | Pemberton et al. | 180/167 |
| 2005/0216182 | A1 * | 9/2005 | Hussain et al. | 701/200 |
| 2007/0288133 | A1 * | 12/2007 | Nishira et al. | 701/23 |
| 2008/0208408 | A1 * | 8/2008 | Arbitmann et al. | 701/41 |
| 2008/0275647 | A1 * | 11/2008 | Shin et al. | 701/301 |
| 2008/0319610 | A1 * | 12/2008 | Oechsle et al. | 701/41 |
| 2009/0125204 | A1 * | 5/2009 | Kudo | 701/96 |
| 2010/0274435 | A1 * | 10/2010 | Kondoh et al. | 701/29 |
| 2011/0040482 | A1 * | 2/2011 | Brimble et al. | 701/301 |
| 2011/0093134 | A1 * | 4/2011 | Emanuel et al. | 701/2 |
| 2011/0169663 | A1 * | 7/2011 | Stahlin et al. | 340/933 |
| 2011/0178710 | A1 * | 7/2011 | Pilutti et al. | 701/301 |
| 2012/0101701 | A1 * | 4/2012 | Moshchuk et al. | 701/70 |
| 2012/0262284 | A1 * | 10/2012 | Irrgang et al. | 340/435 |
| 2013/0079990 | A1 * | 3/2013 | Fritsch et al. | 701/41 |
| 2013/0124041 | A1 * | 5/2013 | Belser et al. | 701/41 |
| 2013/0179047 | A1 * | 7/2013 | Miller et al. | 701/70 |
| 2014/0032049 | A1 * | 1/2014 | Moshchuk et al. | 701/42 |
| 2014/0222278 | A1 * | 8/2014 | Fujita | 701/25 |
| 2014/0244151 | A1 | 8/2014 | Matsubara et al. | |

FOREIGN PATENT DOCUMENTS

| | | |
|---|---|---|
| JP | 2007-204044 A | 8/2007 |
| JP | 2011-150473 A | 8/2011 |
| JP | 2013-071603 A | 4/2013 |
| WO | 2011/101223 A2 | 8/2011 |
| WO | 2013/051082 A1 | 4/2013 |

* cited by examiner

DRIVING ASSISTANCE SYSTEM FOR VEHICLE

CROSS-REFERENCE TO RELATED APPLICATIONS

This is a national phase application based on the PCT International Patent Application No. PCT/JP2011/072751 filed Oct. 3, 2011, the entire contents of which are incorporated herein by reference.

TECHNICAL FIELD

The present invention relates to technologies of providing driving assistance for avoiding a solid object existing in the course of the self-vehicle.

BACKGROUND ART

There has been developed heretofore driving assistance systems that detect a solid object existing in front of the self-vehicle and, if a collision of the self-vehicle with the detected solid object is predicted to occur, warns the driver or automatically performs driving operations for avoiding a collision of the self-vehicle with the solid object.

In a known technology pertaining to the driving assistance system as described above, a solid object existing around the self-vehicle is detected using a camera, a laser radar, or the like, and assistance for steering and/or braking operation is performed based on the degree of risk determined in relation to the type of the solid object and the time to collision (TTC) (see, for example, Patent Document 1).

PRIOR ART DOCUMENTS

Patent Documents

Patent Document 1: Japanese Patent Application Laid-Open No. 2007-204044

DISCLOSURE OF THE INVENTION

Problem to be Solved by the Invention

In the method of the above-described prior art, it is necessary to calculate the degree of risk in regard to the longitudinal (or front-rear) direction of the vehicle and the lateral (or left-right) direction of the vehicle for all of the obstacles existing around the self-vehicle. Therefore, if driving assistance for avoiding a solid object existing in the course of the self-vehicle and then avoiding another solid object is to be performed, the computational load on the driving assistance system can be high.

The present invention has been made in view of the above described circumstances, and an object of the present invention is to provide a technology that enables a driving assistance system that performs driving assistance for avoiding a solid object existing in the course of the self-vehicle to perform effective driving assistance while keeping the load on the driving assistance system low.

Means for Solving the Problem

To achieve the object, when a solid object that can be an obstacle exists in the course of the self-vehicle, a driving assistance system for a vehicle according to the present invention determines a plurality of paths along which the self-vehicle can travel by changing the momentum thereof, designates an avoidance line along which the solid object can be avoided from among the plurality of paths, and changes the momentum of the self-vehicle in such a way that the self-vehicle travels along the selected avoidance line. If the plurality of primary paths do not include an avoidance line, the driving assistance system selects a candidate for avoidance line (candidate-avoidance-line) using a distance to a point of arrival at an avoidance area (arrival distance) as a parameter.

Specifically, the driving assistance system for a vehicle according to the present invention comprises:

recognition means for recognizing a solid object existing in the surrounding of a self-vehicle and generating information about a relative position of the solid object and the self-vehicle;

setting means for setting a grid map representing relative positions of the present location of the self-vehicle, an avoidance area, a safe area, and an unknown area on the basis of the information generated by said recognition means, the avoidance area being an area in which a solid object exists, the safe area being an area in which no solid object exists, and the unknown area being an area in which it is not known whether a solid object exists or not; and assistance means for, when the course of the self-vehicle crosses said avoidance area in the grid map set by said setting means, determining a plurality of primary paths, designating an avoidance line from among the plurality of primary paths, and changing the momentum of the self-vehicle in such a way that the self-vehicle travels along the designated avoidance line, the primary paths being paths along which the self-vehicle can travel by changing the momentum of the self-vehicle, and the avoidance line being a path along which the avoidance area can be avoided, wherein when said plurality of primary paths do not include a path along which said avoidance area can be avoided, said assistance means selects a candidate-avoidance-line from among said plurality of primary paths using an arrival distance as a parameter, the arrival distance being a distance to a point of arrival at said avoidance area.

The "candidate-avoidance-line" mentioned above is a path that is expected to allow the self-vehicle to avoid said avoidance area by changing the momentum of the vehicle in the middle of the avoidance line.

When there is a possibility that the self-vehicle collides, after avoiding a solid object (which will be hereinafter referred to as the "first solid object") existing in the course of the self-vehicle, with another solid object (which will be hereinafter referred to as the "second solid object"), the driving assistance system for a vehicle according to the present invention selects, as a candidate-avoidance-line, a primary path that is expected to allow the self-vehicle to avoid said avoidance area by changing the momentum of the vehicle again after avoiding the first solid object. In consequence, it is possible to set an avoidance line along which both the first and second solid objects can be avoided, based on the candidate-avoidance-line.

Since the driving assistance system for a vehicle according to the present invention designates an avoidance line utilizing a candidate-avoidance-line selected from among the primary paths, it can reduce the load on the driving assistance system and designate an avoidance line promptly.

The driving assistance system for a vehicle according to the present invention may determine a plurality of secondary paths along which the self-vehicle is predicted to travel if the momentum of the self-vehicle is changed in the middle of said candidate-avoidance-line and designate an avoidance line from among the plurality of secondary paths.

With this feature, it is possible to determine an avoidance line along which the first and second solid objects can be avoided while reducing the increase in the load on the driving assistance system. In consequence, a situation in which driving assistance performed to avoid the first solid object causes the self-vehicle to collide with the second solid object can be prevented from occurring.

The "momentum of the self-vehicle" in the context of this specification is a momentum correlating with the turning energy of the vehicle, which may be, for example, the yaw rate or the lateral acceleration in the left-right direction of the vehicle. When determining the plurality of primary paths or the plurality of secondary paths, the assistance means may determine, as the primary paths or secondary paths, a plurality of paths along which the self-vehicle is predicted to travel if the steering angle of the vehicle is varied in the left and right directions in predetermined angular increments. The "predetermined angular increment" mentioned here may be equal to, for example, the smallest angle by which the assistance means can change the steering angle.

In the driving assistance system for a vehicle according to the present invention, the setting means may be adapted to set a value representing the degree of risk for the self-vehicle in traveling through a cell (traveling cost) for each of the cells in the grid map. In this setting, the travel cost of the cells in the avoidance area are to be set larger than the travel cost of the cells in the unknown area, and the travel cost of the cells in the unknown area are to be set larger than travel cost of the cells in the safe area.

The driving assistance system for a vehicle according to the present invention may set a plurality of paths along which the self-vehicle is predicted to travel if the steering angle of the vehicle is varied in the left and right directions in predetermined angular increments in the middle of the candidate-avoidance-line as secondary paths and calculate the total travel cost or the sum of the travel costs of all the cells that each secondary path crosses to select the secondary path for which the total travel cost is smallest as an avoidance line.

With this method, the secondary path along which the probability of crossing the unknown area is lowest among the secondary paths along which the avoidance area can be avoided, that is, the safest secondary path is set as an avoidance line.

In the case where an avoidance line is set based on the total travel costs of the respective secondary paths, the driving assistance system for a vehicle according to the present invention may exclude secondary paths, among the aforementioned plurality of secondary paths, of which the length through the unknown area or the number of times of crossing cells in the unknown area is larger than an upper limit value from the options of the avoidance line. The reason for this is that if a solid object exists in the unknown area, the longer the distance through which the self-vehicle travels the unknown area, the higher the probability of collision of the self-vehicle with the solid object in the unknown area is. Thus, when a solid object that is not recognized by the recognition means exists in the unknown area, driving assistance that guides the self-vehicle to the unknown area is prevented from being performed.

The driving assistance system for a vehicle according to the present invention may be adapted to select a primary path of which the arrival distance is equal to or larger than a threshold as the candidate-avoidance-line, from among said plurality of primary paths. The "threshold" mentioned above may be, for example, a value equal to the arrival distance that allows the self-vehicle to avoid a collision with the solid object if the momentum of the self-vehicle is changed by either the maximum amount of change that the driving assistance system can control or the maximum amount of change that the occupants of the vehicle can allow, whichever is the smaller, plus a margin.

In the case where the self-vehicle is to be guided to a path along which the solid object can be avoided in the middle of a primary path of which the arrival distance is short, it is necessary to change the momentum of the vehicle greatly. Then, there is a possibility that the amount of change of the momentum needed to avoid the solid object exceeds the range of control by the driving assistance system or that great G-force acts on the occupants of the vehicle.

On the other hand, in the case where the self-vehicle is to be guided to a path along which the solid object can be avoided in the middle of a primary path of which the arrival distance is long, the amount of change of the momentum of the self-vehicle may be within the range of control by the driving assistance system, and the G-force acting on the occupants with the change of the momentum can be kept small. Therefore, if a primary path of which the arrival distance is equal to or longer than a threshold is selected as a candidate-avoidance-line, driving assistance by which the solid object can be avoided can be performed with the G-force acting on the occupant being kept small.

When there are a plurality of primary paths of which the arrival distance is equal to or longer than the threshold, the driving assistance system for a vehicle according to the present invention may select the primary path of which the arrival distance is longest as a candidate-avoidance-line. If the candidate-avoidance-line is selected in this manner, it is possible to perform driving assistance by which the solid object can be avoided while minimizing the G-force acting on the occupants.

The driving assistance system for a vehicle according to the present invention may select a primary path of which the arrival distance is longer than the arrival distance of an adjacent primary path by a length equal to or larger than a predetermined length, as a candidate-avoidance-line. The reason for this is that if secondary paths are determined as paths starting from points in the middle of primary paths of which the arrival distances are substantially equal to each other, it is highly probable that the secondary paths do not include a path along which the solid object can be avoided. The "predetermined length" mentioned above is a length determined in advance by an adaptation process based on, for example, experiments.

When there are a plurality of primary paths of which the arrival distance is equal to or larger than the threshold, or when there are a plurality of primary paths of which the arrival distance is longer than the arrival distance of an adjacent primary path by a length equal to or larger than the predetermined length, the driving assistance system for a vehicle according to the present invention may select the primary path of which said arrival distance is longest among the plurality of primary paths, as the candidate-avoidance-line. Then, driving assistance by which the solid object can be avoided with further improved reliability can be performed.

In the above-described driving assistance system, when the number of secondary paths as options of the avoidance line is large, the load on the driving assistance system may be high and the time taken to determine the avoidance lines may be long. In view of this, when the difference between the arrival distance of a secondary path along which the self-vehicle can travel if the steering angle of the self-vehicle is changed in the left or right direction by a predetermined angle in the middle of the candidate-avoidance-line and the arrival distance of the candidate-avoidance-line is smaller than a reference value, the driving assistance system for a vehicle according to the present invention may be adapted not to perform a determination of secondary paths on the left or right side of the candidate-avoidance-line.

For example, when the difference between the arrival distance of a secondary path along which the self-vehicle is predicted to travel if the steering angle of the vehicle is changed in the left direction by a predetermined angle in the middle of the candidate-avoidance-line and the arrival distance of the candidate-avoidance-line is smaller than the reference value, a determination of secondary paths is not performed in the range on the left side of the candidate-avoidance-line, and a determination of secondary paths is performed only in the range on the right side of the candidate-avoidance-line. On the other hand, when the difference between the arrival distance of a secondary path along which the self-vehicle is predicted to travel if the steering angle of the vehicle is changed in the right direction by a predetermined angle in the middle of the candidate-avoidance-line and the arrival distance of the candidate-avoidance-line is smaller than the reference value, a determination of secondary paths is not performed in the range on the right side of the candidate-avoidance-line, and a determination of secondary paths is performed only in the range on the left side of the candidate-avoidance-line.

The above-described limitation of the range of determination of secondary paths reduces the load on the driving assistance system, enabling quick determination of an avoidance line. The "reference value" mentioned above is a value determined in advance by an adaptation process based on, for example, experiments.

Effects of the Invention

The present invention enables a driving assistance system that performs driving assistance for avoiding a solid object existing in the course of the self-vehicle to perform effective driving assistance while keeping the load on the driving assistance system low.

THE BEST MODE FOR CARRYING OUT THE INVENTION

In the following, a specific embodiment of the present invention will be described with reference to the drawings. Here, an exemplary case in which the present invention is applied to a system that recognizes a travel path for a self-vehicle and/or a solid object that can be an obstacle and performs driving assistance for preventing deviation from the recognized travel path and/or avoiding a collision with the solid object. The construction of the embodiment described in the following is an illustrative mode of the present invention and not intended to limit the present invention.

Figure 1:
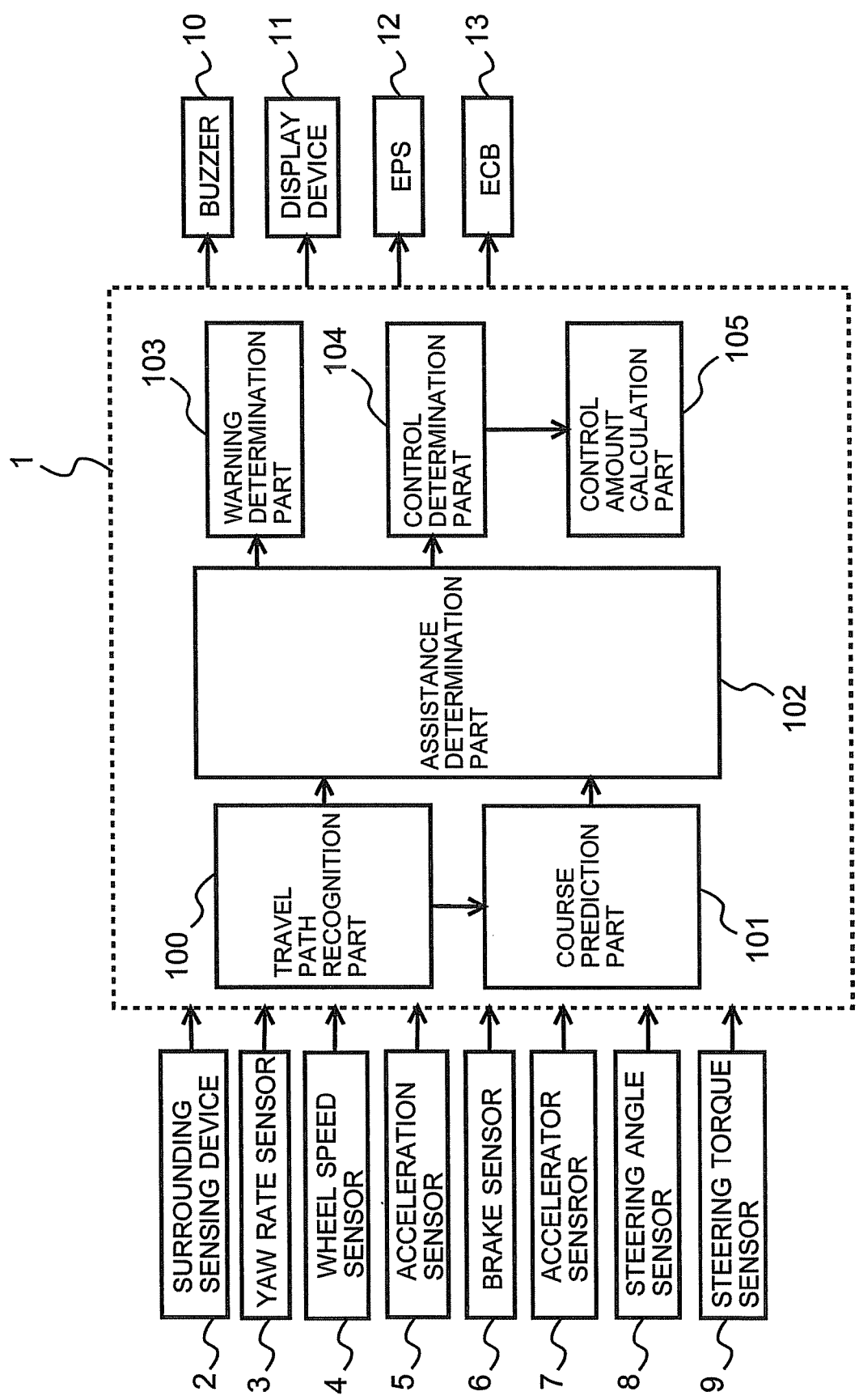
FIG. 1 is a diagram showing the configuration of a driving assistance system for a vehicle according to the present invention.

FIG. 1 is a block diagram showing, on a function-by-function basis, the configuration of a driving assistance system for a vehicle to which the present invention is applied. As shown in FIG. 1, the vehicle is equipped with a control unit (ECU) 1 for driving assistance.

The ECU 1 is an electronic control unit having a CPU, a ROM, a RAM, a backup RAM, and I/O interface etc. The ECU 1 is electrically connected with various sensors such as a surrounding sensing device 2, a yaw rate sensor 3, a wheel speed sensor 4, an acceleration sensor 5, a brake sensor 6, an accelerator sensor 7, a steering angle sensor 8, and a steering torque sensor 9. Signals output from these sensors are input to the ECU 1.

The surrounding sensing device 2 includes, for example, at least one measurement device selected from among an LIDAR (Laser Imaging Detection And Ranging), an LRF (Laser Range Finder), and a stereo camera. The surrounding sensing device 2 acquires, by detection, information about a relative position (e.g. relative distance and/or relative angle) of the self-vehicle and a solid object existing in the surrounding of the vehicle. The surrounding sensing device 2 corresponds to the recognition means according to the present invention.

The yaw rate sensor 3 is mounted, for example, on the body of the self-vehicle and outputs an electrical signal correlating with the yaw rate γ of the self-vehicle. The wheel speed sensor 4 is attached to a wheel of the vehicle and outputs an electrical signal correlating with the running speed of the vehicle (vehicle speed V). The acceleration sensor 5 outputs electrical signals correlating with the acceleration of the self-vehicle in the front-rear direction (longitudinal acceleration) and the acceleration of the self-vehicle in the left-right direction (lateral acceleration).

The brake sensor 6 is attached, for example, to a brake pedal provided in the cabin and outputs an electrical signal correlating with the operation torque of (or depression force acting on) the brake pedal. The accelerator sensor 7 is attached, for example, to an accelerator pedal provided in the cabin and outputs an electrical signal correlating with the operation torque of (or depression force acting on) the accelerator pedal. The steering angle sensor 8 is attached, for example, to a steering rod connected with a steering wheel provided in the cabin and outputs an electrical signal correlating with the rotational angle of the steering wheel (steering angle) relative to a neutral position. The steering torque sensor 9 is attached to the steering rod and outputs an electrical signal correlating with the toque (steering torque) exerted on the steering wheel.

The ECU 1 is also connected with various devices such as a buzzer 10, a display device 11, an electric power steering (EPS) 12, and an electronically controlled brake (ECB) 13. These devices are electrically controlled by the ECU 1.

The buzzer 10 is provided, for example, in the cabin to provide warning sound or the like. The display device 11 is provided, for example, in the cabin to display various messages and warning light. The electric power steering (EPS) 12 is a device that assists the steering torque of the steering wheel utilizing torque generated by an electric motor. The electronically controlled brake (ECB) 13 is a device that electrically adjusts the operation oil pressure (brake oil pressure) of friction brakes provided for the respective wheels.

To control various devices using signals output from the above-described various sensors, the ECU 1 has the following functions. The ECU 1 has a travel path recognition part 100, a course prediction part 101, an assistance determination part 102, a warning determination part 103, a control determination part 104, and a control amount calculation part 105.

The travel path recognition part 100 generates information about the road (travel path) on which the self-vehicle will travel, on the basis of information output from the surrounding sensing device 2. For example, the travel path recognition part 100 generates grid coordinates representing the positions of solid objects that can be obstacles to the self-vehicle (e.g. curbstones extending on the side of the lane, guard rails, grooves, walls, poles, and other vehicles) in a two dimensional grid map having an origin at the position of the self-vehicle and information about the posture of the self-vehicle relative to such solid objects and the lane boundaries (e.g. the distance and yaw angle relative to them).

Figure 2:
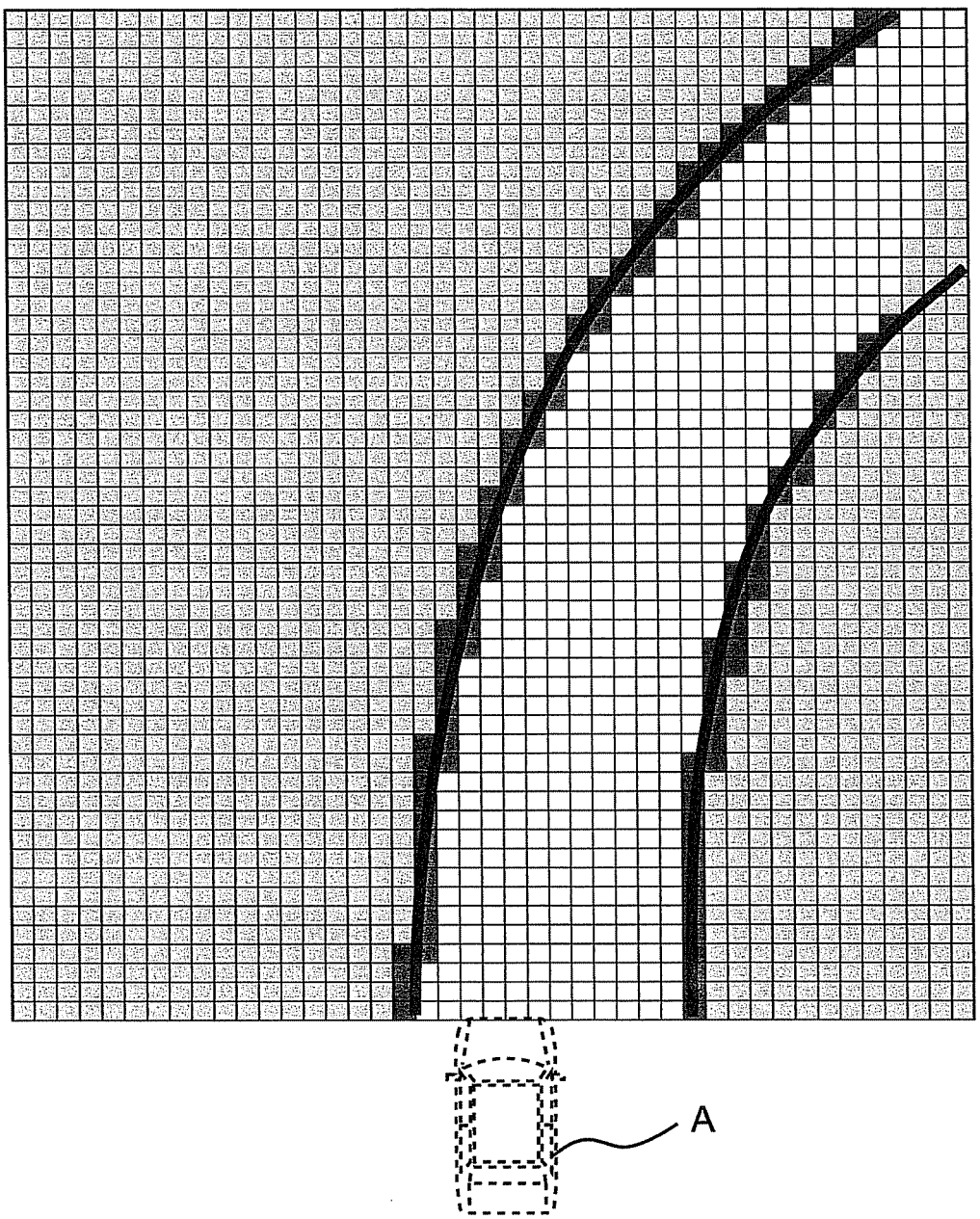
FIG. 2 is a diagram illustrating a method of generating a grid map.

A method of generating the grid map will be described with reference to FIG. 2. FIG. 2 is a grid map in a case where the road curves to the right. The two solid lines in FIG. 2 represent the edges of the road. These lines are added for the purpose of illustration of the method of generating the grid map.

The travel path recognition part 100 designates the cells in the grid map located at the positions at which the solid objects detected by the surrounding sensing device 2 exist as avoidance areas (the dark gray filled areas in FIG. 2). Then, the travel path recognition part 100 designates the cells located on virtual lines connecting the solid objects detected by the surrounding sensing device 2 and the self-vehicle as safe areas (the non-filled areas in FIG. 2). If no solid object is detected on virtual lines connecting the drivers own vehicle and positions delimiting the range of sensing by the surrounding sensing device 2 (e.g. edges of the grid map), the travel path recognition part 100 designates the cells located on these virtual lines as unknown areas. Furthermore, the travel path recognition part 100 designates the cells at blind positions hidden by the solid objects (i.e. cells located behind the solid objects as seen from the self-vehicle) as unknown areas (the light gray filled areas in FIG. 2).

Figure 3:
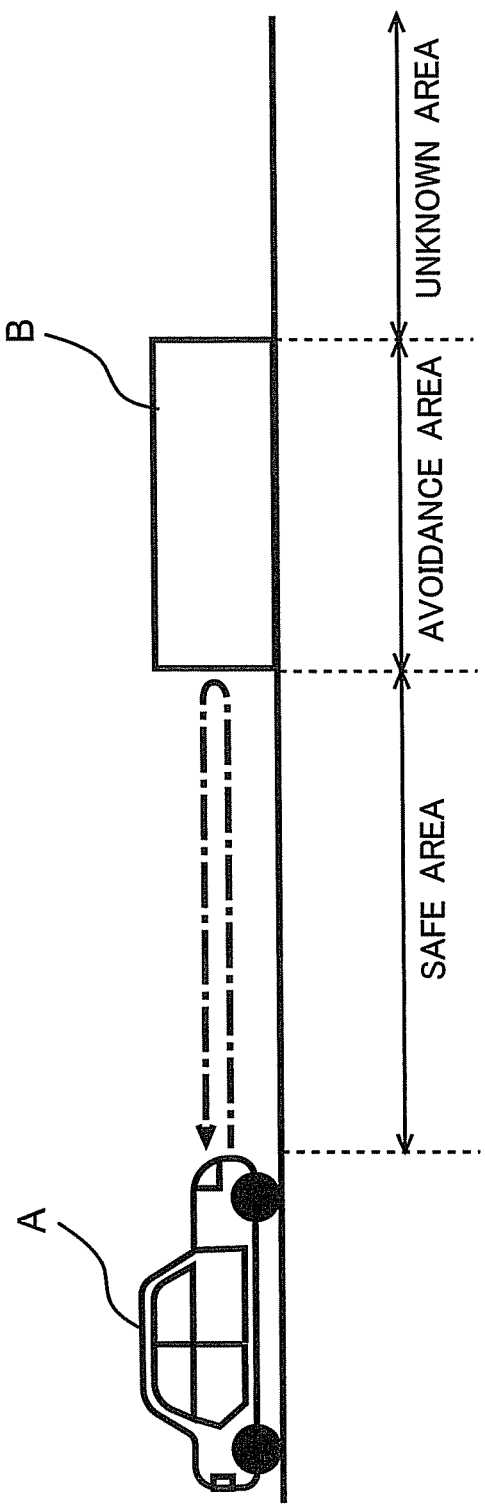
FIG. 3 is a diagram illustrating a method of setting an avoidance area and a safe area.

In the initial state of the grid map, all the cells are designated as unknown areas. When the surrounding sensing device 2 recognizes a solid object as shown in FIG. 3 (for example, when radar waves emitted from the surrounding sensing device 2 return to it as reflected waves), the travel path recognition part 100 changes the status of the cells at the position of a solid object B from unknown areas to avoidance areas and changes the status of the cells on the virtual lines connecting the avoidance areas and the self-vehicle A from unknown areas to safe areas.

When the grid map is generated according to this method, an area(s) in which a solid object(s) may possibly exist will not be designated as a safe area(s), even in cases where the surrounding sensing device 2 fails to detect a solid object or in cases where there are areas that cannot be sensed by the surrounding sensing device 2. The travel path recognition part 100 corresponds to the setting means according to the present invention.

The course prediction part 101 predicts a route (or course) which the self-vehicle will follow if the vehicle runs while maintaining the present momentum. Specifically, the course prediction part 101 calculates the turning radius R on the assumption that the self-vehicle will run while maintaining the present vehicle speed V and the yaw rate γ and determines the course on the basis of the turning radius R thus calculated and the width of the self-vehicle. The turning radius R can be calculated by dividing the vehicle speed V by the yaw rate γ.

Figure 4:
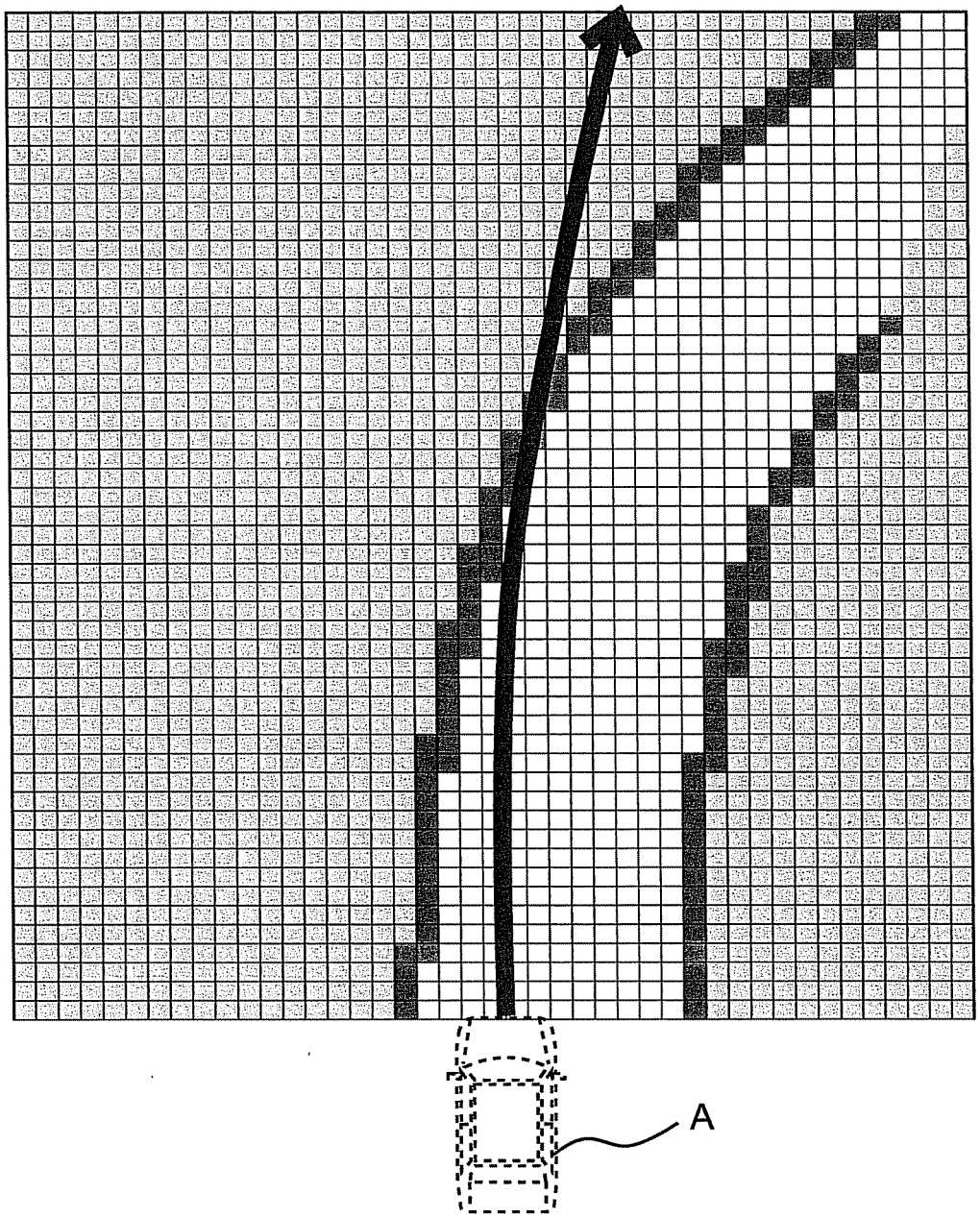
FIG. 4 is a diagram showing an exemplary case in which a solid object (or avoidance area) exists in the course of the self-vehicle.
Figure 5:
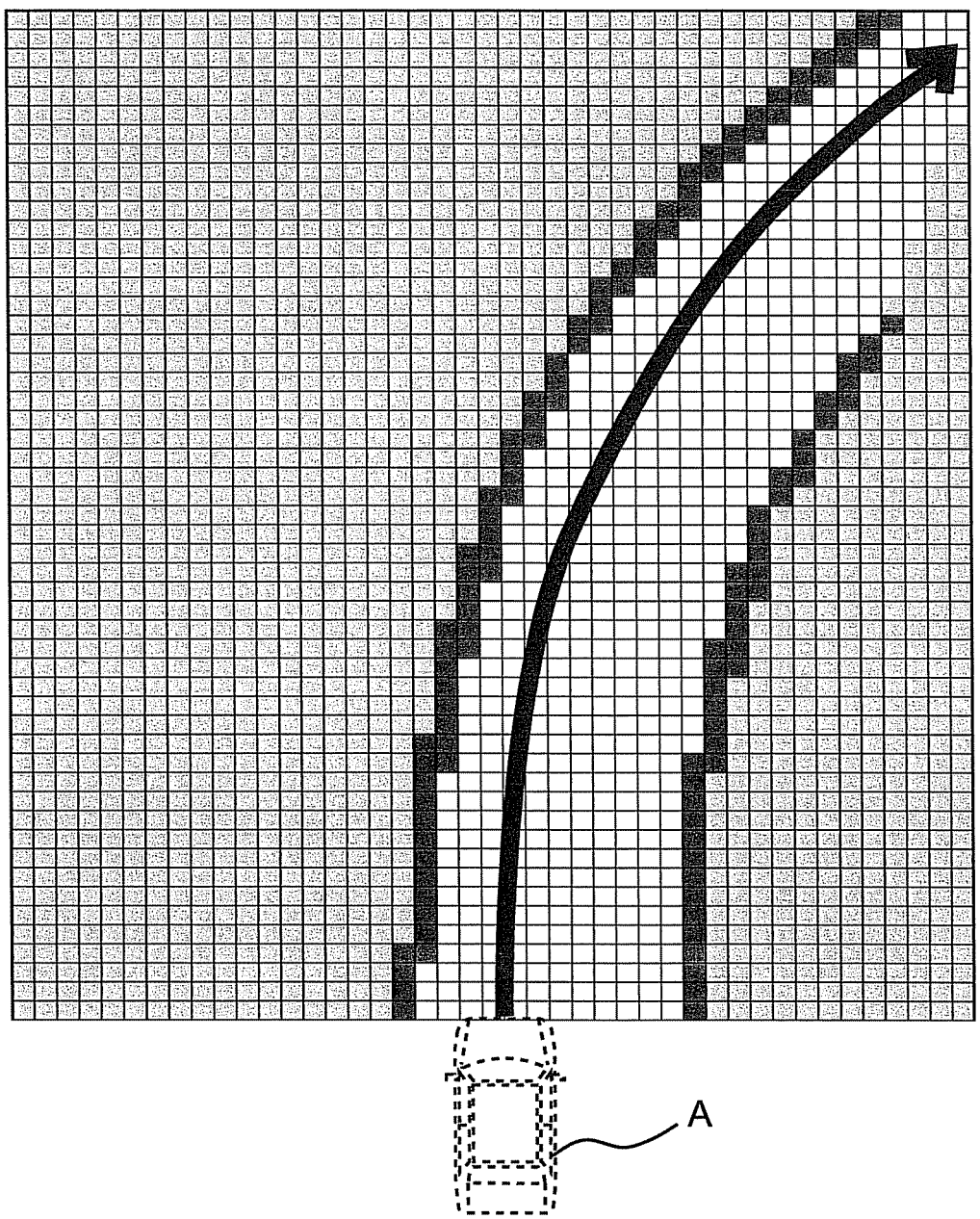
FIG. 5 is a diagram showing an exemplary case in which no solid object (or avoidance area) exists in the course of the self-vehicle.

The assistance determination part 102 determines whether or not driving assistance is to be performed, on the basis of the grid map generated by the travel path recognition part 100 and the course predicted by the course prediction part 101. Specifically, the assistance determination part 102 determines whether or not the course of the self-vehicle crosses an avoidance area in the grid map. In this process, if as shown in FIG. 4, the course of the self-vehicle A (the solid arrow in FIG. 4) crosses an avoidance area, the assistance determination part 102 determines that it is necessary to perform driving assistance. On the other hand, if as shown in FIG. 5, the course of the self-vehicle A (the solid arrow in FIG. 5) crosses no avoidance area, the assistance determination part 102 determines that it is not necessary to perform driving assistance.

The warning determination part 103 warns the driver by buzzing of the buzzer 10 and/or display of a warning message or warning light on the display device 11, when it is determined by the assistance determination part 102 that it is necessary to perform driving assistance. For example, the warning determination part 103 may cause the buzzer 10 to buzz and/or cause the display device 11 to display the warning message or warning light immediately at the time when it is determined by the assistance determination part 102 that it is necessary to perform driving assistance. Alternatively, the warning determination part 103 may cause the buzzer 10 to buzz and/or cause the display device 11 to display the warning message or warning light immediately at the time when the distance between the self-vehicle and a solid object becomes equal to or shorter than a predetermined distance. Alternatively, the warning determination part 103 may calculate the time taken for the self-vehicle A to reach the solid object B along the path in which the distance between the self-vehicle and the solid object is largest and cause the buzzer 10 to buzz and/or cause the display device 11 to display the warning message or warning light at the time when the result of the calculation becomes equal to or shorter than a predetermined time.

The predetermined distance and the predetermined time mentioned above may be changed responsive to a signal output from the yaw rate sensor 3 and/or a signal output from the wheel speed sensor 4. For example, the predetermined distance or the predetermined time may be set longer when the vehicle speed is high than when it is low. The predetermined distance or the predetermined time may be set longer when the yaw rate is high than when it is low.

The way of warning the driver is not limited to buzz of the buzzer 10 or display of a warning message or warning light on the display device 11, but other methods such as intermittently changing the fastening torque of the sheet belt may be employed.

When it is determined by the assistance determination part 102 that it is necessary to perform driving assistance, the control determination part 104 determines the timing for automatically performing a driving operation needed to avoid a collision of the self-vehicle with a solid object. (This operation will be hereinafter referred to as "avoidance operation".)

Specifically, the control determination part 104 may be configured to synchronize the time at which the avoidance operation is to be performed with the time when the distance between the self-vehicle and the solid object becomes equal to or smaller than a predetermined distance. Alternatively, the control determination part 104 may be configured to calculate the time taken for the self-vehicle to reach the solid object, and to synchronize the time at which the avoidance operation is to be performed with the time when the result of the calculation becomes equal to or shorter than a predetermined time. The "avoidance operation" mentioned here includes an operation of changing the steering angle of wheels using the electric power steering (EPS) 12, and an operation of changing the braking force exerted on wheels using the electronically controlled brake (EBC) 13 may also be employed additionally.

The predetermined distance and the predetermined time referred to by the control determination part 104 may be varied in relation to the vehicle speed and the yaw rate, as with the predetermined distance and the predetermined time referred to by the warning determination part 103 described above. The predetermined distance and the predetermined time referred to by the control determination part 104 should be set equal to or shorter than the predetermined distance and the predetermined time referred to by the warning determination part 103 described above.

When the timing for performing the avoidance operation is determined by the control determination part 104, the control amount calculation part 105 calculates control amounts for the electric power steering (EPS) 12 and the electronically controlled brake (ECB) 13 and controls the electric power steering (EPS) 12 and the electronically controlled brake (ECB) 13 in accordance with the control amounts thus calculated and the timing for performing the avoidance operation determined by the control determination part 104.

Figure 6:
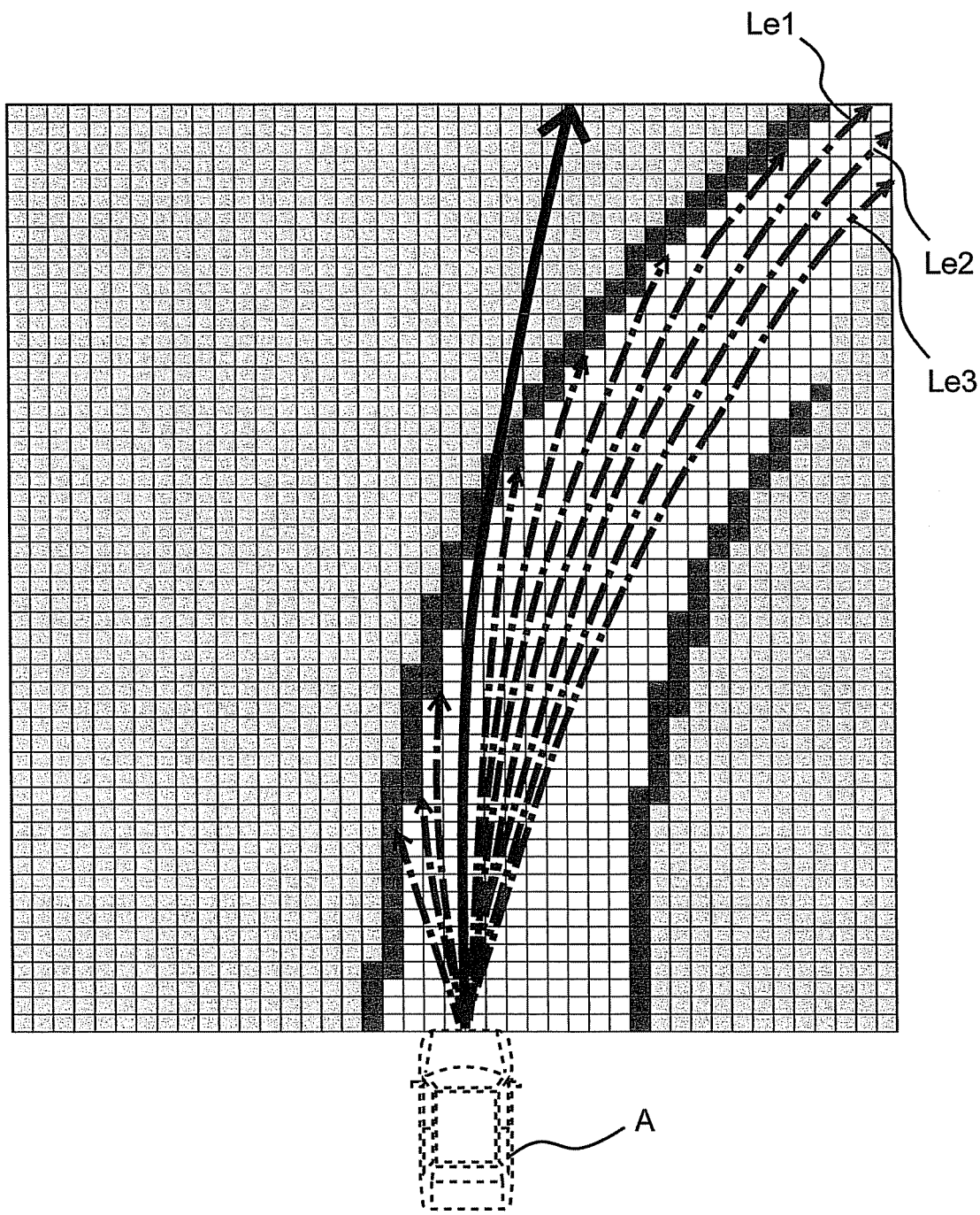
FIG. 6 is a diagram illustrating a method of designating an avoidance line.

Specifically, the control amount calculation part 105 designates an avoidance line along which a collision of the self-vehicle with the solid object can be avoided. The method of specifying the avoidance line will be described with reference to FIGS. 6 to 13. The control amount calculation part 105 determines a plurality of primary paths (represented by the dot-and-dash arrows in FIG. 6) along which the self-vehicle is predicted to travel if the steering angle of the vehicle is varied in predetermined angular increments. The "predetermined angular increment" mentioned here is equal to the smallest angle by which the ECU 1 can control the steering angle.

The control amount calculation part 105 selects, from among aforementioned primary paths, a primary path that crosses no avoidance area and no unknown area (paths Le1, Le2, and Le3 in FIG. 6) as the avoidance line. When there are a plurality of primary paths that cross no avoidance area and no unknown area, the control amount calculation part 105 may select the primary path that can be followed with the smallest change in the steering angle from the steering angle at the present time (that is, in the case shown in FIG. 6, path Le1).

Figure 7:
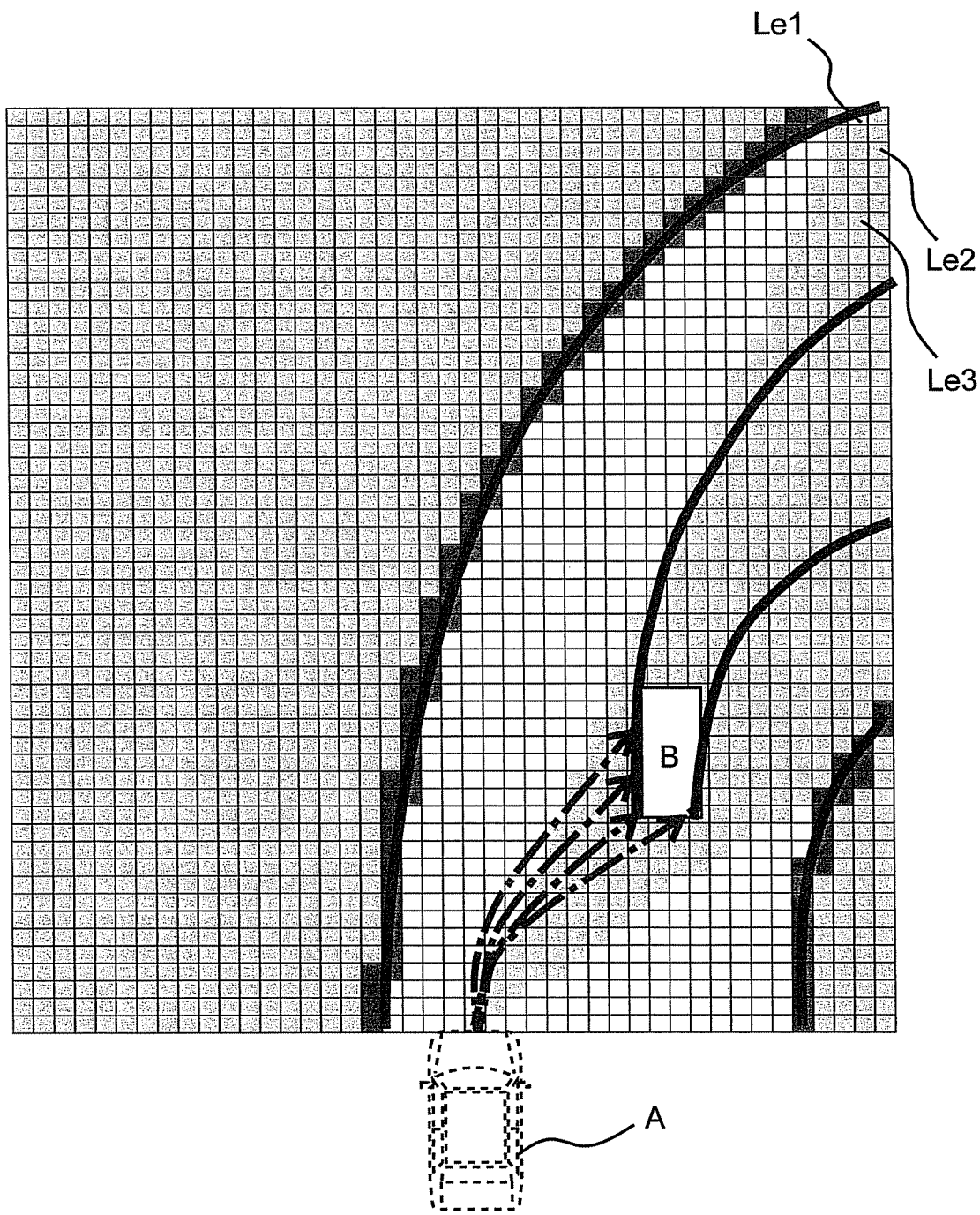
FIG. 7 is a diagram showing exemplary paths excluded from options of the avoidance line.

In the case where a travel cost is set for each of the cells in the grid map, the control amount calculation part 105 may be adapted to calculate the sum of the travel costs of all the cells that each primary path crosses (total travel cost) for all of the aforementioned plurality of primary paths and to select the primary path for which the total travel cost thus calculated is the smallest. In this process, the control amount calculation part 105 should exclude primary paths of which the length through the unknown area (or the number of times of crossing cells of unknown areas) is larger than a predetermined value from the options of the avoidance line. For example, as shown in FIG. 7, if a solid object B existing at a fork of a road fails to be recognized, the primary paths leading to a collision with the solid object B (i.e. the paths represented by the dot-and-dash arrows in FIG. 7) are excluded from the options of the avoidance line. In the case where there are a plurality of primary paths for which the total travel cost is smallest, the control amount calculation part 105 may select the primary path that can be followed with the smallest change in the steering angle from the steering angle at the present time.

The "travel cost" mentioned above is a value set in accordance with the degree of risk in traveling through a cell. For example, the travel cost of the cells of avoidance area is set larger than the travel cost of the cells of unknown area, and the travel cost of the cells of unknown area is set larger than travel cost of the cells of safe area. The travel cost of the cells of unknown area may be varied in accordance with their size. For example, the travel cost may be set larger for a larger cell than for a smaller cell in the unknown area. This is because the probability of the existence of a solid object in a cell is larger in a larger cell than in a smaller cell. The travel cost as described above may be set by the travel path recognition part 100 in generating the grid map.

There may be a case where as avoidance lines for avoiding a solid object (first solid object) existing in the course of the self-vehicle, there is no other choice than paths that may lead to a collision with another solid object (second solid object). For example, as shown in FIG. 8, there may be a case where all the primary paths along which a first solid object B1 existing in the course of the self-vehicle A (represented by the solid arrow in FIG. 8) can be avoided (i.e. the paths represented by the solid arrows L14, L15, and L16 in FIG. 8) do not allow avoidance of a second solid object B2.

In the above-described case, the control amount calculation part 105 is adapted to determine avoidance lines along which the first and second solid objects B1, B2 can be avoided by changing the steering angle of the self-vehicle again in the middle of the primary paths. In this process, if a search for avoidance lines is performed for all of the plurality of primary paths, an excessively high computational load may be placed on the driving assistance system and the time taken to determine the avoidance lines may become long.

In view of this, the control amount calculation part 105 is adapted to select a primary path of which the arrival distance is longer than a threshold and longer than the arrival distance(s) of the adjacent primary path(s) by a predetermined margin or more and to perform a search for an avoidance line only for the selected primary path (candidate-avoidance-line).

Figure 8:
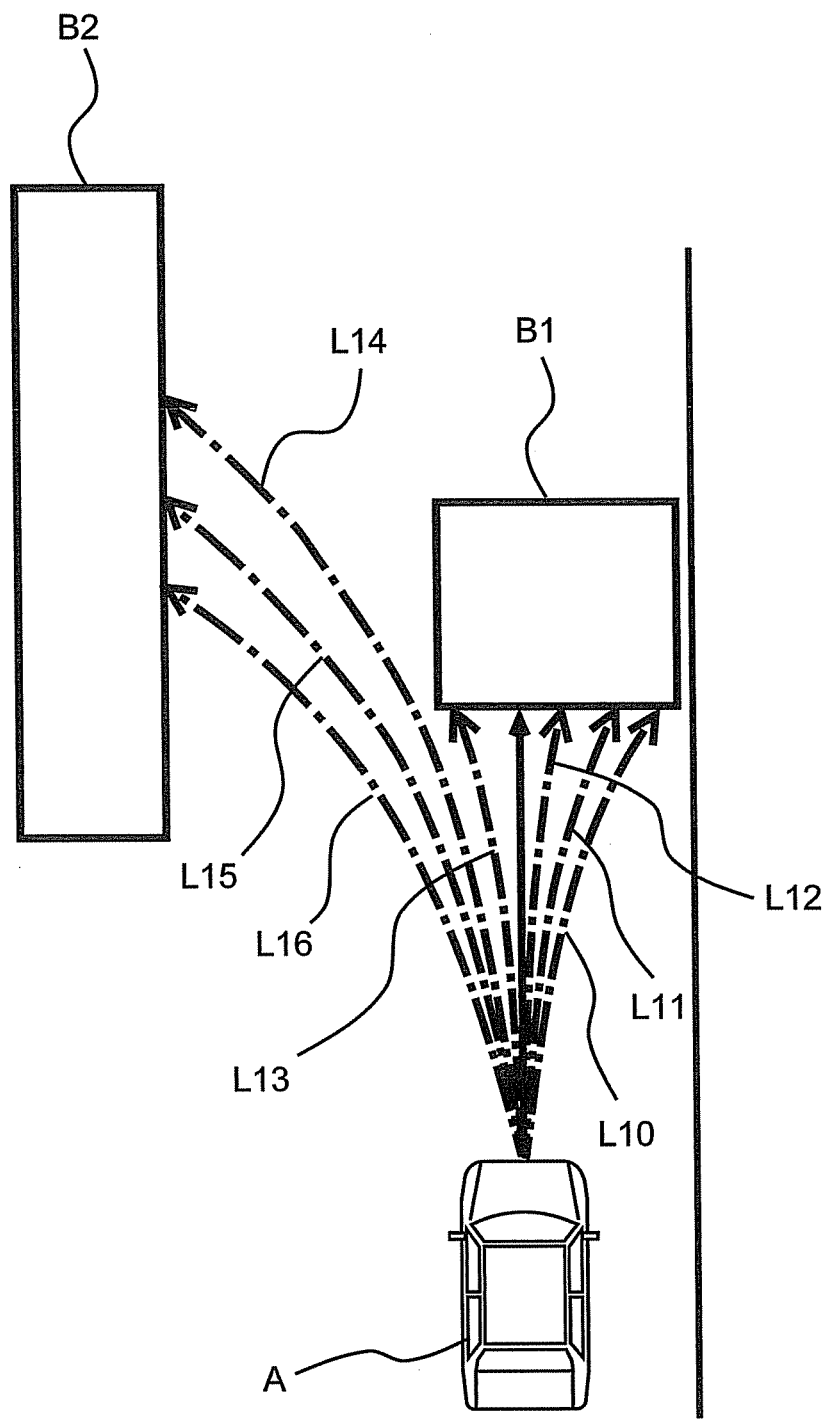
FIG. 8 is a diagram illustrating an exemplary case in which the primary paths do not include an avoidance line.

In the case where the above-described condition is set, for example, primary paths L10, L11, and L12 in FIG. 8 are excluded from the options of the candidate-avoidance-line, because the differences between the arrival distances of the primary paths L10, L11, and L12 in FIG. 8 and the arrival distances of the respective adjacent primary paths are smaller than the predetermined margin, and the arrival distances of primary paths L10, L11, and L12 are shorter than the threshold. Primary path L13 in FIG. 8 is excluded from the options of the candidate-avoidance-line, because the arrival distance thereof is shorter than the threshold. Primary path L15 in FIG.

8 is excluded from the options of the candidate-avoidance-line, because the arrival distance thereof is shorter than that of the adjacent primary path L14, though not shorter than the threshold. Primary path L16 in FIG. 8 is excluded from the options of the candidate-avoidance-line, because the arrival distance thereof is shorter than that of the adjacent primary path L15, though not shorter than the threshold. Thus, primary path L14 is selected as the candidate-avoidance-line, in the case illustrated in FIG. 8.

Figure 9:
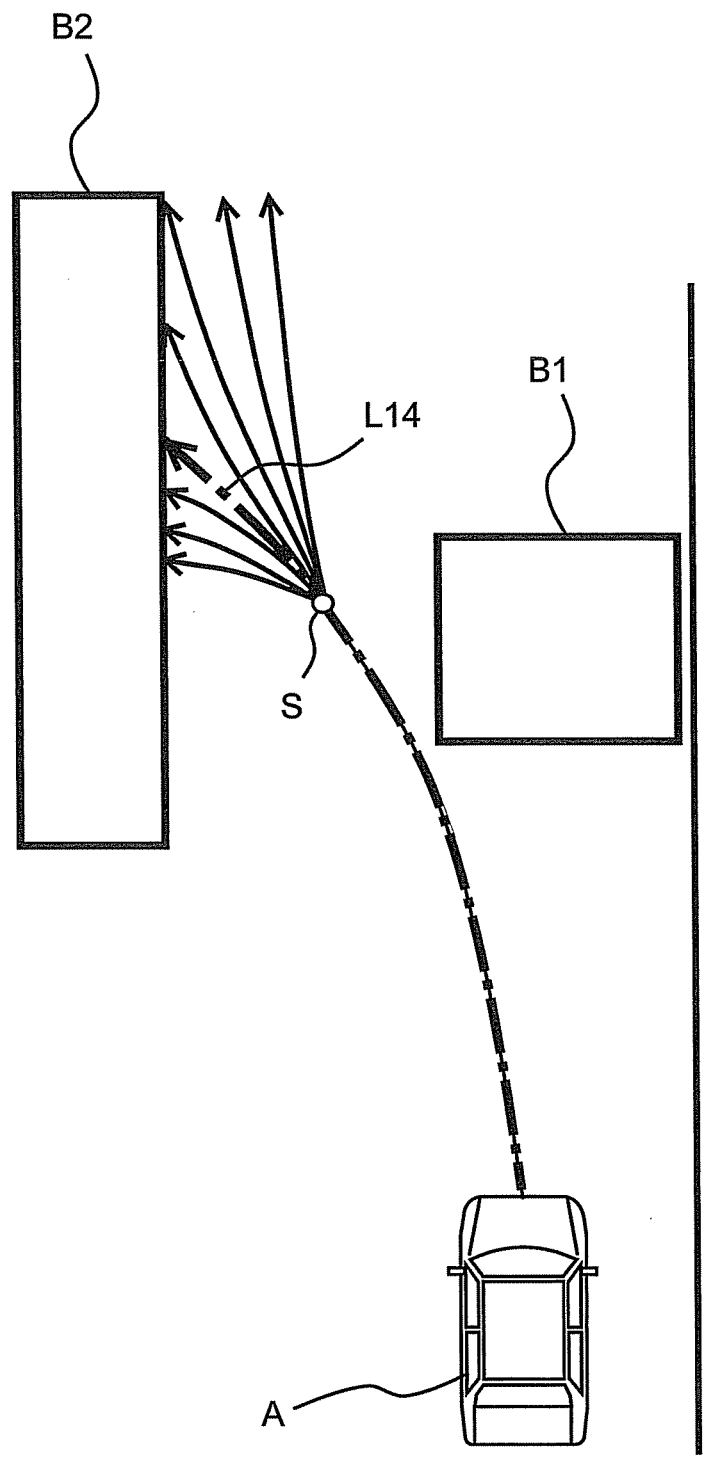
FIG. 9 is a diagram illustrating a method of determining secondary paths starting from a point in the middle of a primary path.

Thereafter, as shown in FIG. 9, the control amount calculation part 105 determines secondary paths (represented by solid arrows in FIG. 9) that starts from a diverging point (point S in FIG. 9) set in the middle of the candidate-avoidance-line and along which the self-vehicle is predicted to travel if the steering angle is varied in the left and right directions in predetermined angular increments. Then, the control amount calculation part 105 designates an avoidance line from among the plurality of secondary paths. The method of this designation is the same as the method of designating avoidance lines from among the plurality of primary paths. Specifically, the control amount calculation part 105 selects, from among the secondary paths, a path that crosses no avoidance area and no unknown area as the avoidance line. In the case where a travel cost is set for each of the cells in the grid map, the control amount calculation part 105 may be adapted to select the secondary path for which the total travel cost thus calculated is smallest among the aforementioned secondary paths. In this process, the control amount calculation part 105 should exclude secondary paths of which the length through the unknown area (or the number of times of crossing cells of unknown area) is larger than a predetermined value from the options of the avoidance line. In the case where there are a plurality of secondary paths that pass no avoidance area and no unknown area or where there are a plurality of secondary paths for which the total travel cost is smallest, the control amount calculation part 105 may select the secondary path that can be followed with the smallest change in the steering angle from the steering angle for the candidate-avoidance-line.

If the process for determining whether or not the avoidance area can be avoided and the process of calculating the total travel cost are performed for all of the plurality of secondary paths, an excessively high computational load may be placed on the driving assistance system and the time taken to determine the avoidance lines may become long.

Figure 10:
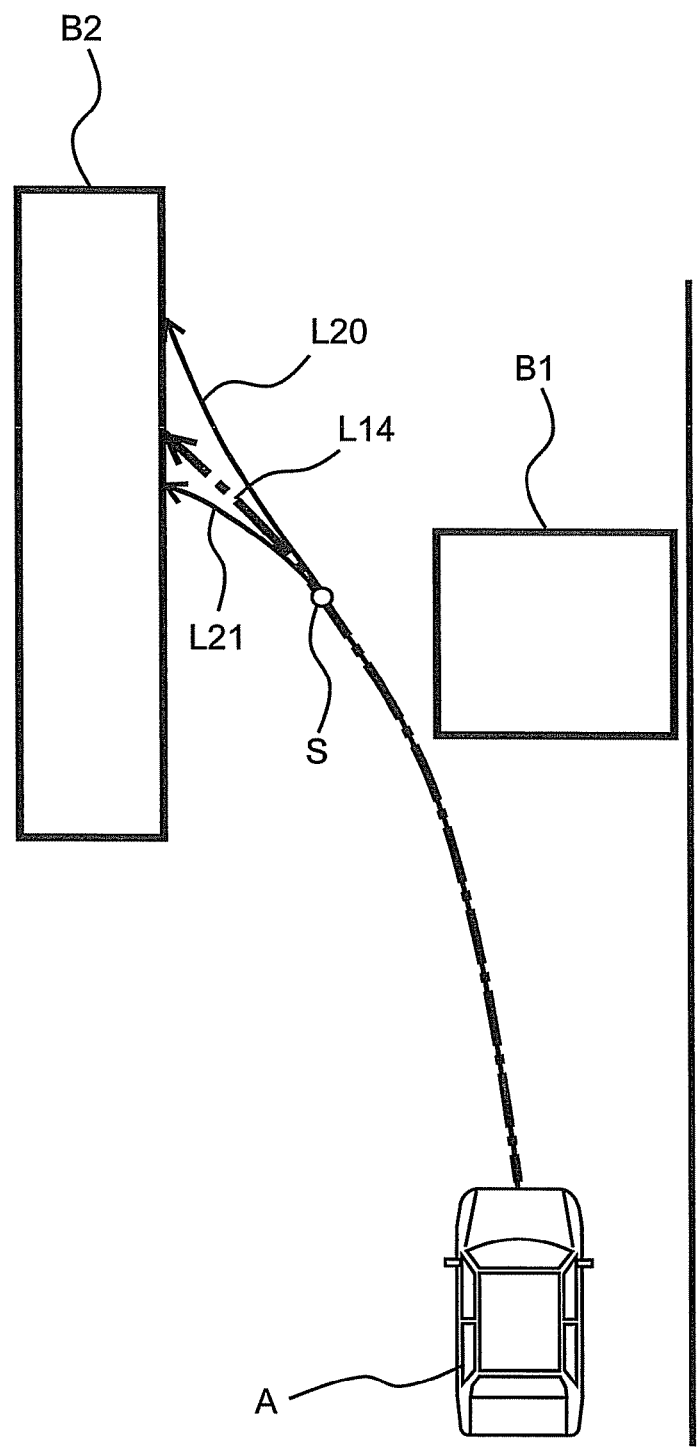
FIG. 10 is a diagram illustrating a method of limiting the range in which secondary paths are set.

In view of this, the control amount calculation part 105 may be adapted to determine secondary paths in a limited manner only on one of the left and right sides of the candidate-avoidance-line. Specifically, as shown in FIG. 10, the control amount calculation part 105 determines a secondary path L20 along which the self-vehicle is predicted to travel if the steering angle is changed to the right by a predetermined angle at the diverging point and a secondary path L21 along which the self-vehicle is predicted to travel if the steering angle is changed to the left by a predetermined angle at the diverging point. Then, the control amount calculation part 105 calculates an extended amount of the arrival distance by subtracting the arrival distance of the candidate-avoidance-line (i.e. the length of the candidate-avoidance-line from the self-vehicle to the solid object) from the arrival distance of each of the secondary paths L20 and L21 (equal to the sum of the length of the candidate-avoidance-line from the self-vehicle to the diverging point and the length of the secondary path between the diverging point and the solid object). In other words, the control amount calculation part 105 calculates an increase (or extended amount) in the arrival distance of each of the secondary paths in relation to the arrival distance of the candidate-avoidance-line. When the extended amount in one of the secondary paths L20 and L21 is smaller than a threshold, the control amount calculation part 105 may do away with a determination of secondary paths on the side same as this secondary path.

For example, if the extended amount in the secondary path L20 is smaller than the threshold, the control amount calculation part 105 performs a determination of secondary paths only in a range on the left side of the candidate-avoidance-line. On the other hand, if the extended amount in the secondary path L21 is smaller than the threshold, the control amount calculation part 105 performs a determination of secondary paths only in a range on the right side of the candidate-avoidance-line. Such a limitation of the range of determination of secondary paths reduces the computational load on the driving assistance system, leading to a reduction in the time taken until the avoidance line is determined. If the extended amounts in both the secondary lines L20 and L21 are smaller than the threshold, the control amount calculation part 105 may determination of secondary paths on both the right and left sides of the candidate-avoidance-line or only on the side same as the secondary path whose arrival distance is longer.

Figure 11:
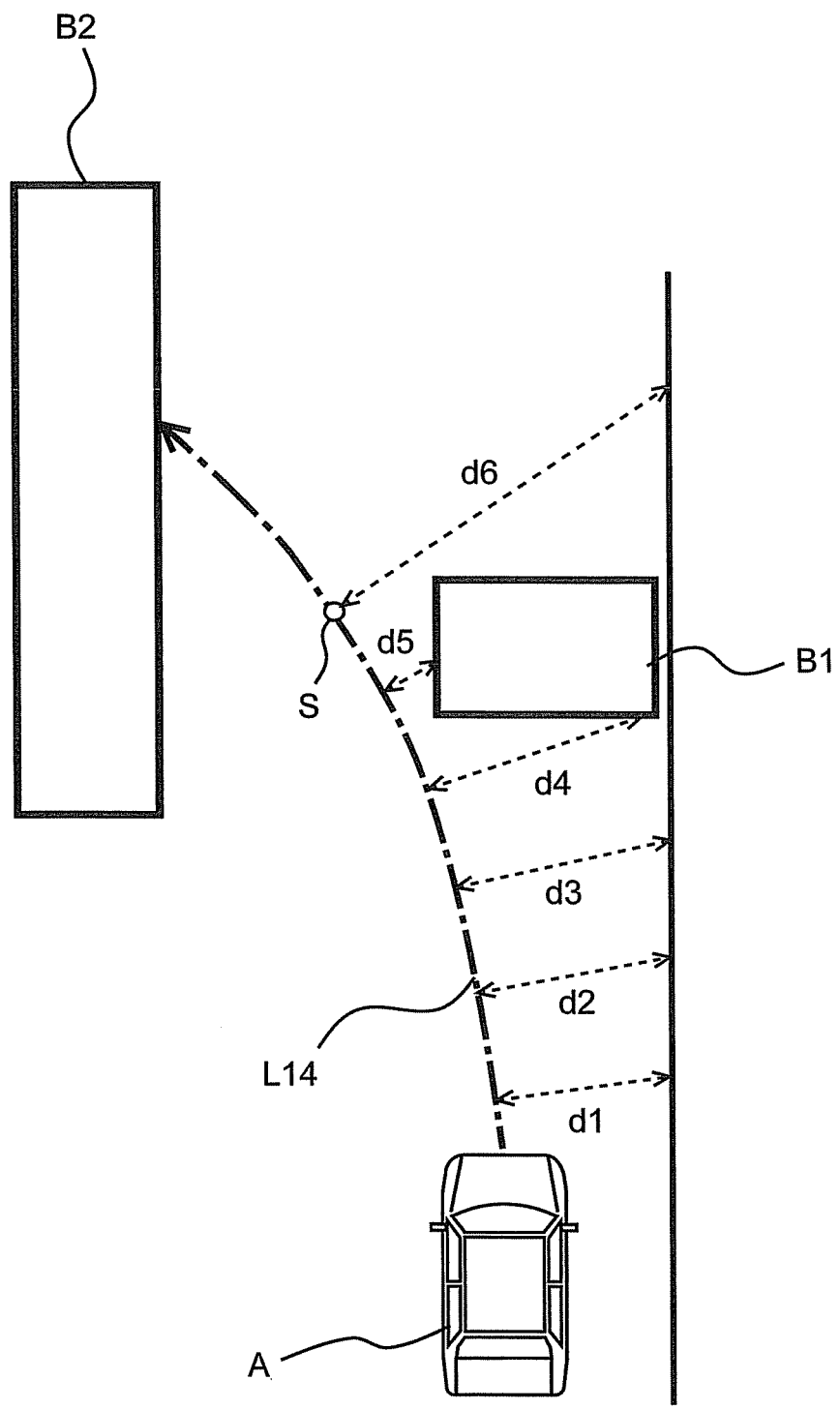
FIG. 11 is a diagram illustrating a method of setting a diverging point.
Figure 12:
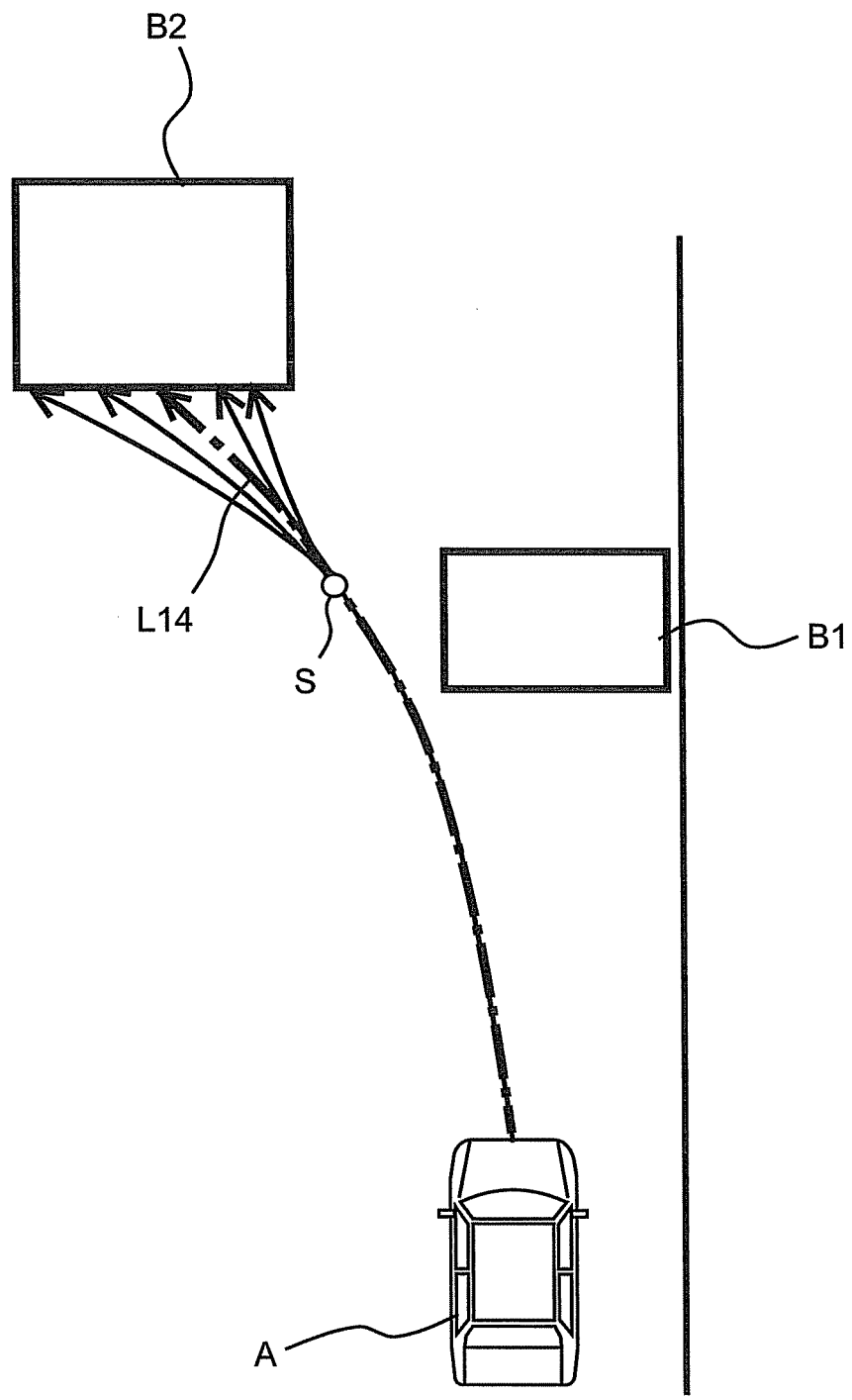
FIG. 12 shows an exemplary case in which the secondary paths determined based on the diverging point do not include an avoidance line.

The aforementioned diverging point may be set at a plurality of points arranged at regular intervals on the candidate-avoidance-line. However, as the number of the diverging points is increased, the computational load on the driving assistance system becomes higher, because it is necessary to determination of secondary paths at every diverging point. As shown in FIG. 11, the control amount calculation part 105 is adapted to calculate lateral distances (d1, d2, d3, d4, d5, and d6 in FIG. 11) at points arranged at regular intervals (e.g. points spaced by a constant distance or a distance which the self-vehicle travel in a constant time) successively in order in the direction away from the self-vehicle. Here, the lateral distance refers to the distance between the candidate-avoidance-line and a solid object along the lateral direction of the avoidance line. Then, the control amount calculation part 105 sets a diverging point at a point at which the lateral distance is longer than the lateral distance at the immediately preceding point by a length not smaller than a specific length. The "specific length" mentioned here is a length equal to the sum of the shortest lateral distance among the plurality of lateral distances having been already calculated, error of measurement of the surrounding sensing device 2, and a margin. For example, at the time when lateral distance d6 is calculated as shown in FIG. 11, the specific length is the sum of the shortest distance among lateral distances d1, d2, d3, d4, and d5 (e.g. d5 in FIG. 11), error of measurement of the surrounding sensing device 2, and a margin. In the case where solid objects exist on both the left and right sides of the candidate-avoidance-line, the control amount calculation part 105 uses either the lateral distance on the right side of the candidate-avoidance-line or the lateral distance on the left side of the candidate-avoidance-line, whichever is shorter, as the aforementioned lateral distance.

Figure 13:
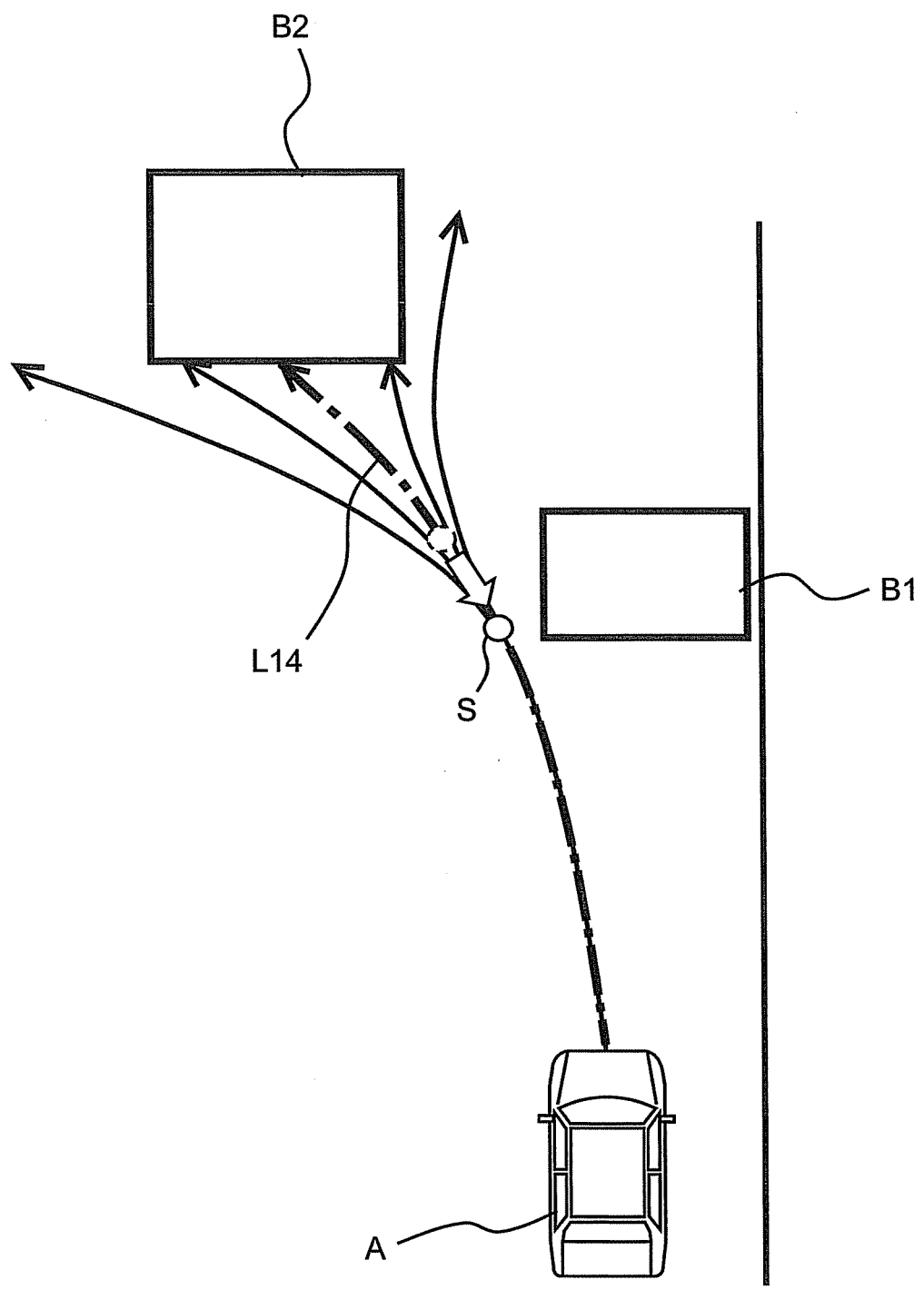
FIG. 13 is a diagram showing exemplary secondary paths determined in a case where the position of the diverging point is shifted toward the self-vehicle.

In the case where a plurality of secondary paths are determined on the basis of the above-described diverging point, there is a possibility that there is no secondary path along which a second solid object B2 can be avoided, among the secondary paths. When this is the case, the control amount calculation part 105 may shift the position of the diverging point toward the self-vehicle as illustrated in FIG. 13. The amount of shift $\Delta l$ in this case can be calculated by the following equation:

$$\Delta l = d / \tan \theta_{max}.$$

In the above equation, d is the lateral distance calculated immediately before the calculation of the lateral distance at the diverging point (e.g. d5 in FIG. 11), and θmax is the maximum value of the steering angle that the driving assistance system can control.

If the diverging point is shifted toward the self-vehicle in the above-described manner, it is possible to determine secondary paths along which the second solid object B2 can be avoided as shown in FIG. 13. Consequently, it is possible to set an avoidance line along which the first solid object B1 and the second solid object B2 can be avoided. If the plurality of secondary paths do not include an avoidance line, the control amount calculation part 105 may select a candidate-avoidance-line from among the plurality of secondary paths and determine a plurality of tertiary paths starting from a point in the middle of the selected candidate-avoidance-line. In other words, the control amount calculation part 105 may execute a process of selecting a candidate-avoidance-line, a process of setting a diverging point, and a process of determining paths with changes in the momentum of the self-vehicle at the diverging point repeatedly until an avoidance line is found.

The above-described control amount calculation part 105 corresponds to the assistance means according to the present invention.

With the ECU 1 configured as described above, driving assistance that guides the self-vehicle to an area in which the presence/absence of a solid object is unknown or driving assistance that guides the self-vehicle to an area in which the self-vehicle will collide with a solid object other than a solid object existing in the course of the self-vehicle can be prevented from being performed as long as possible with the increase in the computational load on the ECU 1 being controlled.

Figure 14:
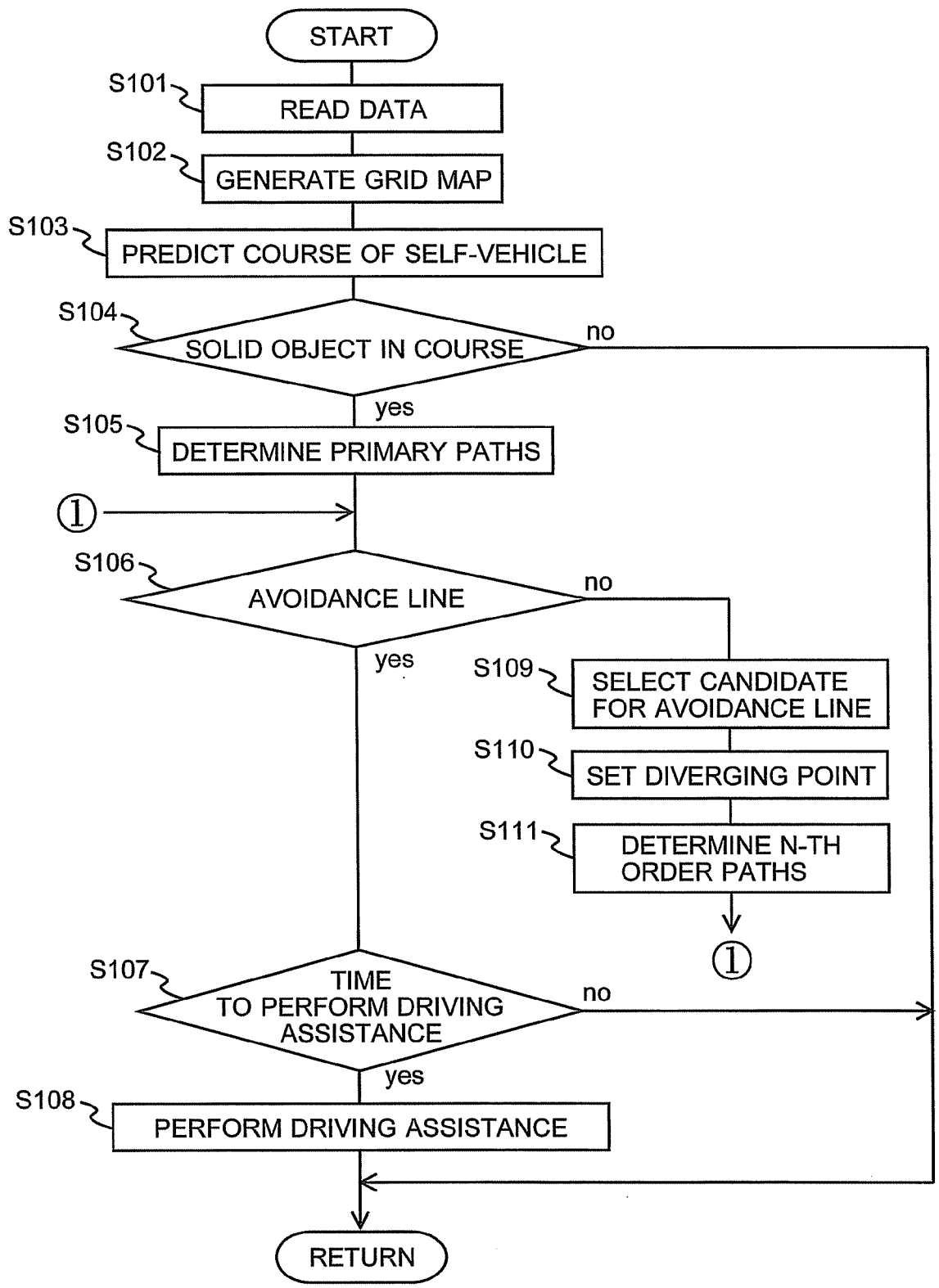
FIG. 14 is a flow chart of the process of executing driving assistance.

In the following, a process of executing driving assistance in this embodiment will be described with reference to FIG. 14. FIG. 14 is a flow chart of a processing routine, which is stored in, for example, the ROM of the ECU 1 and executed repeatedly by the ECU 1.

In the processing routine shown in FIG. 14, first in step S101, the ECU 1 reads a signal output from the surrounding sensing device 2, a signal output from the yaw rate sensor 3 (yaw rate γ), a signal output from the wheel speed sensor 4 (vehicle speed V), and a signal output from the steering angle sensor 10 (steering angle θ).

In step S102, the ECU 1 generates a grid map on the basis of the signal output from the surrounding sensing device 2. Specifically, the ECU 1 operates a grid map in which the status of all the cells is set to be unknown area to change the status of the cells at the position at which a solid object exists into avoidance area and to change the status of the cells located between the solid object and the self-vehicle into safe area. The ECU 1 may further set a travel cost for each cell.

In step S103, the ECU 1 predicts (or computes) the course of the self-vehicle on the basis of the yaw rate γ and the vehicle speed V.

In step S104, the ECU 1 determines whether or not a solid object exists in the course of the self-vehicle on the basis of the grid map generated in the above step S102 and the course predicted in the above step S103. If the determination in step S104 is negative, the ECU 1 once terminates the execution of this routine. On the other hand, if the determination in step S104 is affirmative, the ECU 1 proceeds to step S105.

In step S105, the ECU 1 determines primary paths. Specifically, the ECU 1 computes a plurality of primary paths along which the self-vehicle is predicted to travel when the steering angle θ read in the above step S101 is changed to the left and right in predetermined angular increments. Furthermore, the ECU 1 may calculate the total travel cost for each of the plurality of primary paths.

In step S106, the ECU 1 determines whether or not the plurality of primary paths obtained in the above step S105 include an avoidance line along which the avoidance areas and the unknown areas can be avoided. In the case where a travel cost is set for each of the cells in the grid map, the ECU 1 determines, in step S106, whether or not the plurality of primary paths include a primary path for which the total travel cost is not larger than an allowable limit value. The "allowable limit value" mentioned above is, for example, the possible maximum value of the total travel cost for primary paths that do not cross the avoidance areas and of which the length through the unknown area (or the number of times of crossing cells of unknown area) is not larger than an upper limit value.

If the determination in step S106 is affirmative, the ECU 1 proceeds to step S107, where it determines whether or not it is the time to perform driving assistance. Specifically, the ECU 1 determines whether or not the distance between the self-vehicle and a solid object is equal to or shorter than a predetermined distance. Alternatively, the ECU 1 determines whether or not the time taken for the self-vehicle to reach the solid object is equal to or shorter than a predetermined time. If the determination in step S107 is negative, the ECU 1 once terminates the execution of this routine. On the other hand, if the determination in step S107 is affirmative, the ECU 1 proceeds to step S108.

In step S108, the ECU 1 controls the power steering (EPS) 12 in such a way as to cause the self-vehicle to travel along the avoidance line. More specifically, the ECU 1 controls the electric power steering (EPS) 12 in such a way that the steering angle θ becomes equal to the steering angle adapted to the avoidance line. In the case where there are a plurality of primary paths that cross no avoidance area and no unknown area, or in the case where there are a plurality of primary paths of which the total travel cost is not larger than the allowable limit value, the ECU 1 selects the primary path that can be followed with the smallest change in the steering angle from the steering angle θ at the present time and controls the electric power steering (EPS) 12 according to the steering angle adapted to the selected avoidance line.

If the determination in step S106 is negative, the ECU 1 proceeds to step S109. In step S109, the ECU 1 selects a candidate for avoidance line (candidate-avoidance-line) from among the plurality of primary paths. Specifically, the ECU 1 selects, as a candidate-avoidance-line, a primary path of which the arrival distance is longer than a threshold and longer than the arrival distance of the adjacent primary path by a predetermined margin or more, from among the plurality of primary paths.

In step S110, the ECU 1 sets a diverging point on the candidate-avoidance-line selected in the above step S109. Specifically, the ECU 1 calculates a lateral distance at points on the candidate-avoidance-line arranged at regular intervals in order in the direction away from the self-vehicle. Then, the ECU 1 sets a diverging point at a point at which the lateral distance is longer than the lateral distance at the immediately preceding point by a length not smaller than a specific length.

In step S111, the ECU 1 determines a plurality of secondary paths on the basis of the diverging point set in the above step S110. Specifically, the ECU 1 determines a plurality of secondary paths along which the self-vehicle is predicted to travel if the steering angle is varied in the left and right directions in predetermined angular increments at the aforementioned diverging point. In this process, the ECU 1 may determine secondary paths in a limited manner only on the right or left side of the candidate-avoidance-line. After executing the process of step S111, the ECU 1 executes the process of step S106 and subsequent steps again.

Driving assistance performed in the above-described manner enables the self-vehicle to be prevented from colliding with a solid object even when recognition by the surrounding sensing device 2 is unsuccessful. Furthermore, in the case where there are a plurality of solid objects around the self-vehicle, as is the case when there is a possibility that the self-vehicle collides with a solid object after avoiding another solid object existing in the course of the self-vehicle, it is possible to set a complex avoidance line along which these solid objects can be avoided, while controlling the increase in the computational load on the ECU 1. In consequence, the safety can be improved by driving assistance.

DESCRIPTION OF THE REFERENCE NUMERALS AND SYMBOLS

1: ECU
2: surrounding sensing device
3: yaw rate sensor
4: wheel speed sensor
5: acceleration sensor
6: brake sensor
7: accelerator sensor
8: steering angle sensor
9: steering torque sensor
10: buzzer
11: display device
12: electric power steering (EPS)
13: electronically controlled brake (ECB)
100: travel path recognition part
101: course prediction part
102: assistance determination part
103: warning determination part
104: control determination part
105: control amount calculation part

The invention claimed is:

1. A driving assistance system for a vehicle comprising:
an electronic control unit including a CPU, a ROM, and a RAM, the electronic control including a recognition unit, a setting unit, and an assistance unit, the electronic control unit configured to:
recognize, with the recognition unit, a solid object existing in the surrounding of a self-vehicle and generating information about a relative position of the solid object and the self-vehicle;
set, with the setting unit, a grid map representing relative positions of the present location of the self-vehicle, an avoidance area, a safe area, and an unknown area on the basis of the information generated by said recognition unit, the avoidance area being an area in which a solid object exists, the safe area being an area in which no solid object exists, and the unknown area being an area in which it is not known whether a solid object exists or not; and
when the course of the self-vehicle crosses said avoidance area in the grid map set by said setting unit, determine, with an assistance unit, a plurality of primary paths, when said plurality of primary paths do not include a path along which said avoidance area can be avoided, selecting a candidate-avoidance-line from among said plurality of primary paths using an arrival distance as a parameter, setting, as secondary paths, a plurality of paths along which the self-vehicle can travel if the steering angle of the self-vehicle is changed in the left and right directions in predetermined angular increments in the middle of said candidate-avoidance-line, designating an avoidance line from among the plurality of secondary paths, and changing the momentum of the self-vehicle in such a way that the self-vehicle travels along the designated avoidance line, the primary paths being paths along which the self-vehicle can travel by changing the momentum of the self-vehicle, the arrival distance being a distance to a point of arrival at said avoidance area, and the avoidance line being a path along which the avoidance area can be avoided,
wherein when the difference between the arrival distance of a secondary path along which the self-vehicle can travel when the steering angle of the self-vehicle is changed in the left or right direction by a predetermined angle in the middle of said candidate-avoidance-line and the arrival distance of said candidate-avoidance-line is smaller than a reference value, said assistance unit does not perform a determination of a secondary path on the left or right side of said candidate-avoidance-line.

2. The driving assistance system for a vehicle according to claim 1, wherein said assistance unit selects a primary path of which said arrival distance is equal to or larger than a threshold as the candidate-avoidance-line, from among said plurality of primary paths.

3. The driving assistance system for a vehicle according to claim 1, wherein said assistance unit selects a primary path of which said arrival distance is longer than the arrival distance of an adjacent primary path by a length equal to or larger than a predetermined length, as the candidate-avoidance-line.

4. The driving assistance system for a vehicle according to claim 2, wherein when there are a plurality of primary paths of which the arrival distance is equal to or larger than the threshold, said assistance unit selects the primary path of which said arrival distance is longest, as the candidate-avoidance-line.

5. The driving assistance system for a vehicle according to claim 3, wherein when there are a plurality of primary paths of which the arrival distance is longer than the arrival distance of an adjacent primary path by a length equal to or larger than the predetermined length, said assistance unit selects the primary path of which said arrival distance is longest, as the candidate-avoidance-line.

6. The driving assistance system for a vehicle according to claim 2, wherein said assistance unit selects a primary path of which said arrival distance is longer than the arrival distance of an adjacent primary path by a length equal to or larger than a predetermined length, as the candidate-avoidance-line.

7. The driving assistance system for a vehicle according to claim 6, wherein when there are a plurality of primary paths of which the arrival distance is longer than the arrival distance of an adjacent primary path by a length equal to or larger than the predetermined length, said assistance unit selects the primary path of which said arrival distance is longest, as the candidate-avoidance-line.

* * * * *